United States Patent [19]

Miller

[11] Patent Number: 4,470,472

[45] Date of Patent: Sep. 11, 1984

[54] LOW RANGE AUTOMATIC WEIGHING DEVICE

[75] Inventor: Walter E. Miller, Milford, Conn.

[73] Assignee: Pitney Bowes Inc., Stamford, Conn.

[21] Appl. No.: 395,775

[22] Filed: Jul. 6, 1982

[51] Int. Cl.³ .......................... G01G 1/38; G01G 1/26
[52] U.S. Cl. ...................................... 177/212; 177/248
[58] Field of Search ................................. 177/212, 248

[56] References Cited

U.S. PATENT DOCUMENTS 4,411,328 10/1983 Hubbard ............................. 177/212

Primary Examiner—George H. Miller, Jr.
Attorney, Agent, or Firm—Melvin J. Scolnick; Albert W. Scribner; William D. Soltow, Jr.

[57] ABSTRACT

A weighing device is disclosed which comprises a frame, a pan element for supporting a load to be weighed, channel members connected to the pan for retaining a plurality of weight elements in a vertically movable manner, a motor supported within the frame, a shaft member operatively connected to and extending from the motor and a plurality of support members each adapted to receive and lift one of the weight elements. Included are circular concentric cam tracks rotating with the shaft member, each of the tracks being positioned under a plurality of the support members. A switch is provided for energizing the motor when the pan is depressed by a load. The motor turns the shaft member and guides the concentric cam tracks alternately into contact with successive support members in a step-by-step manner and thereby lift a corresponding number of the weights substantially equal to the weight of the load.

9 Claims, 7 Drawing Figures

LOW RANGE AUTOMATIC WEIGHING DEVICE

BACKGROUND OF THE DISCLOSURE

I. Field of the Invention

This invention relates to weighing devices, and more particularly to low range automatic balance devices having an optical readout system.

II. Description of the Prior Art

Many low range type of scales and balances have been devised and described in the prior art. Many of these devices, however, exhibit numerous problems. A basic disadvantage of a scale as compared to a balance is that scales are sensitive to regional gravitational variations and temperature variations. Several of the low range type of scales and balances described in the prior art do not have the degree of accuracy in weighing that is required in various situations, such as the weighing requirements that exist within the postal field. Furthermore, many of the known weighing devices are not automatic and do not provide for a direct visual readout of the weight of the object being weighed. In addition, many of these devices are relatively complex in design, difficult to manufacture, require the use of high cost materials and are expensive.

One example of a prior art type of low range scale is described in U.S. Pat. No. 2,716,546. The scale illustrated by this patent, when in a rest position, has a plurality of counterweights (balls) supported on a carrier by a spring. When a weight (e.g., a letter) is placed on the weighing pan, the spring extends, thereby successively depositing balls on a plurality of supports which are of different vertical heights so that during the descent of the weighing pan, balls are successively deposited from a shelf onto the supports in a one after the other fashion. A linkage connected to the shelf, and responsive to its vertical height, operates a pointer for indicating the weight on the pan. The scale includes a bimetal strip for compensating for variations in the force of the spring resulting from changes in temperature. The sensitivity of the spring and the required adjusting of each of the counterweights to a particular height are two of the problems related to this type of scale which can alter the accuracy of any weight measurements made thereon. Other examples of scales disclosed by the prior art and relating to the present invention are illustrated in U.S. Pat. Nos. 213,898; 276,701; 1,661,556; 1,944,071; 3,108,647; 4,106,580; and 4,235,296.

In commonly assigned and copending application Ser. No. 361,310, filed Mar. 24, 1982 and entitled "A Low Range Automatic Weighing Device" by D. W. Hubbard there is disclosed a low range automatic balance which overcomes many of the disadvantages of the type of low range weighing devices disclosed in the prior art. Basically, this device comprises a frame, a pan element for supporting a load to be weighed, a channel member connected to the pan for retaining a plurality of weight elements in a vertically movable manner, a motor supported within the frame and a shaft member operatively connected to and extending from the motor and supporting the pan element. A plurality of support members are provided that have top end portions adapted to receive and lift one of the weight elements. A camming arm is secured to the shaft member and extends in a direction toward the support members. A switch is provided for energizing the motor when the pan is depressed by a load. The motor turns the shaft member and guides the camming arm into contact with successive support members in a step-by-step manner to place a number of the support members in an extended position and lift a corresponding number of the weights substantially equal to the weight of the load. Because of the order in which the weight elements are positioned on the pan it is possible that this can result in a slight uneven weight distribution on the pan. This can tend to increase the friction between the motor shaft and the pan.

Alternate type of weighing devices which have resolved the above-described type of problems are described in my commonly assigned and copending application Ser. No. 395,776, filed July 6, 1982 and Ser. No. 395,777, filed July 6, 1982, both entitled "Low Range Automatic Weighing Device".

SUMMARY OF THE INVENTION

It is therefore a primary object of the present invention to overcome many of the disadvantages of the type of low range weighing devices in the prior art and provide a balance which is highly efficient.

It is a further object of the present invention to provide a low range automatic balance which is highly sensitve and highly accurate in its weight measurements.

It is a further object of the present invention to provide a low range automatic balance which has particular use in the postal field and which features a direct visual readout of the weight of the object being weighed.

It is still a further object of the present invention to provide a balance which is relatively simple in design, easy to manufacture, uses low cost materials in its construction and is relatively inexpensive.

The foregoing objects and others are accomplished in accordance with the present invention by providing a weighing device comprising: a frame, a pan element for supporting a load to be weighed, means connected to said pan for retaining a plurality of weight elements in a vertically movable manner, a motor supported within the frame, a shaft member operatively connected to and extending from the motor and supporting the pan element and a plurality of support members each adapted to receive and lift one of the weight elements. Circular concentric cam tracks rotate with the shaft member, each of the tracks being positioned under a plurality of the support members. A switching means is provided for energizing the motor when the pan is depressed by a weighted load, the motor turning the shaft member and guiding the concentric cam tracks alternately into contact with successive support members in a step-by-step manner to lift a number of the support members and thereby lift a corresponding number of the weights equal to the weight of the load.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
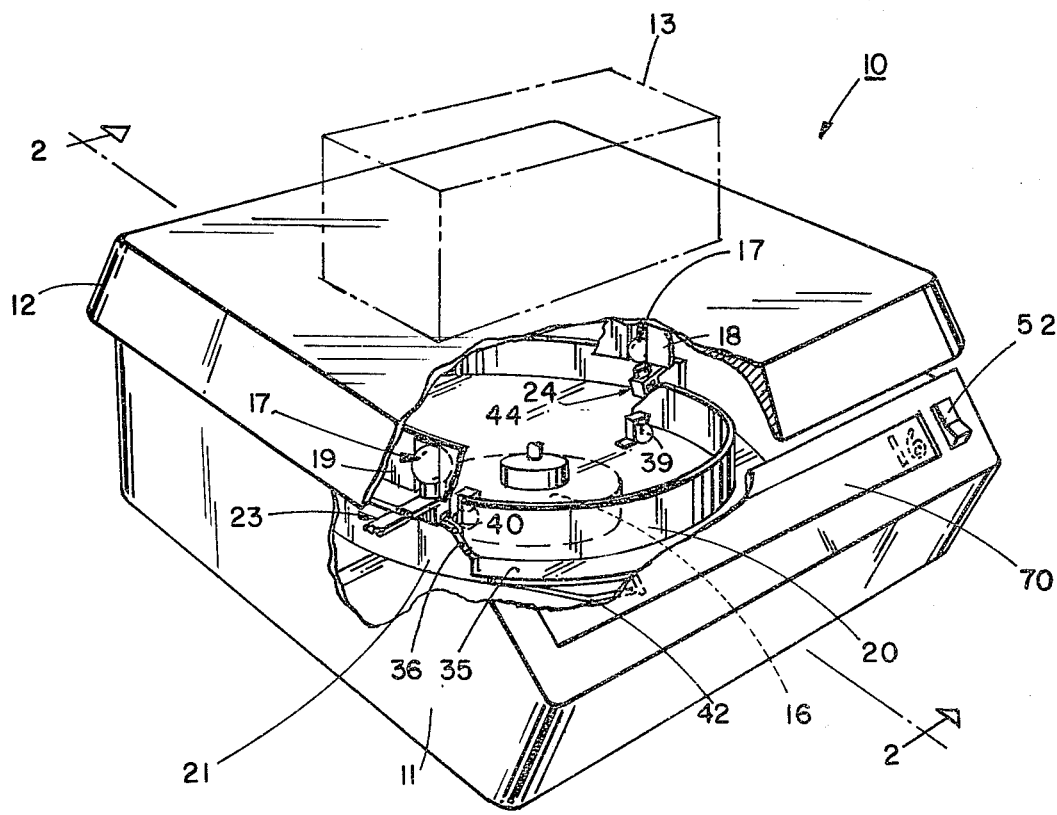
FIG. 1 is a perspective view, partly in section, of a balance in accordance with the features of the present invention.
Figure 2:
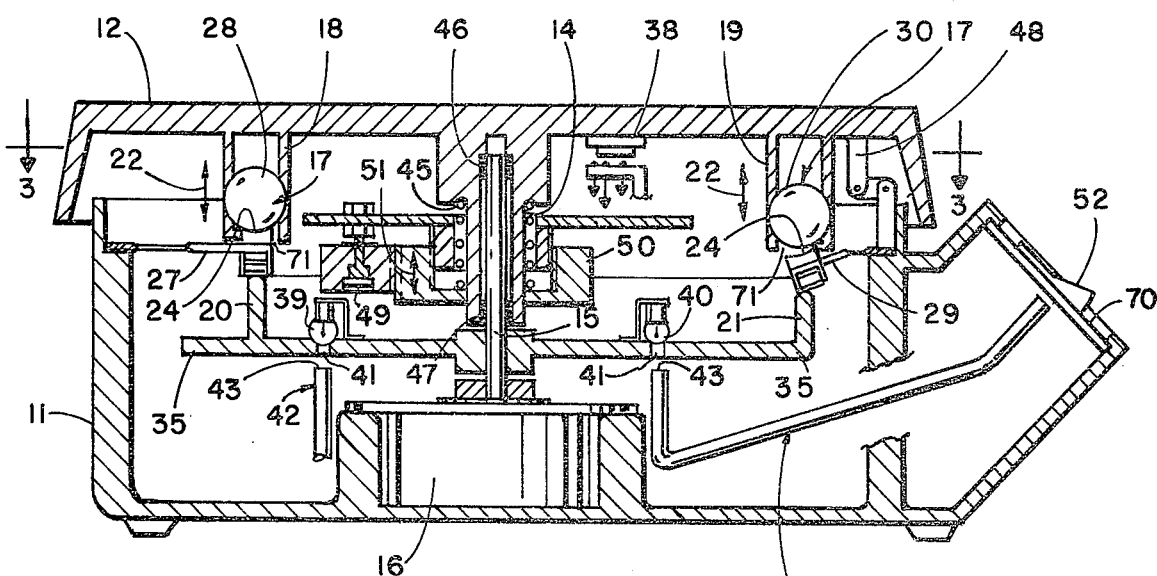
FIG. 2 is a longitudinal sectional view taken along line 2—2 of FIG. 1.

Referring now to the drawings, and particularly to FIGS. 1 and 2, there is shown an embodiment of a weighing device (balance) in accordance with the preferred features of the present invention. The weighing device (balance) 10 includes frame 11 encasing the components thereof. The balance includes a pan element or weighing pan 12 used for supporting a load 13 that is to be weighed by the balance. Preferably extending from the bottom portion of pan 12 is a hollow shaft member 14. The weighing pan is supported by a shaft member 15 that lies within hollow shaft member 14. Shaft member 15 is operatively connected to and extends from a motor 16. The pan includes and supports a plurality of weight elements, preferably in the form of balls 17, that are retained in a plurality of circular and concentric ball retaining rings. In accordance with a preferred embodiment of the present invention, balls 17 are retained in two circularly and concentrically positioned ball retaining rings 18 and 19 that extend from the bottom portion of the pan (see FIG. 3). Ball retaining rings 18 and 19 extend down from the bottom portion of pan 12 preferably in the form of U-shaped channel members and are positioned directly over the path of travel of the concentric cam tracks 20 and 21 in the manner as explained hereinbelow. Each of balls 17 are retained in the retaining rings in a manner which permits each of the balls to move vertically as shown by arrow 22.

Figure 3:
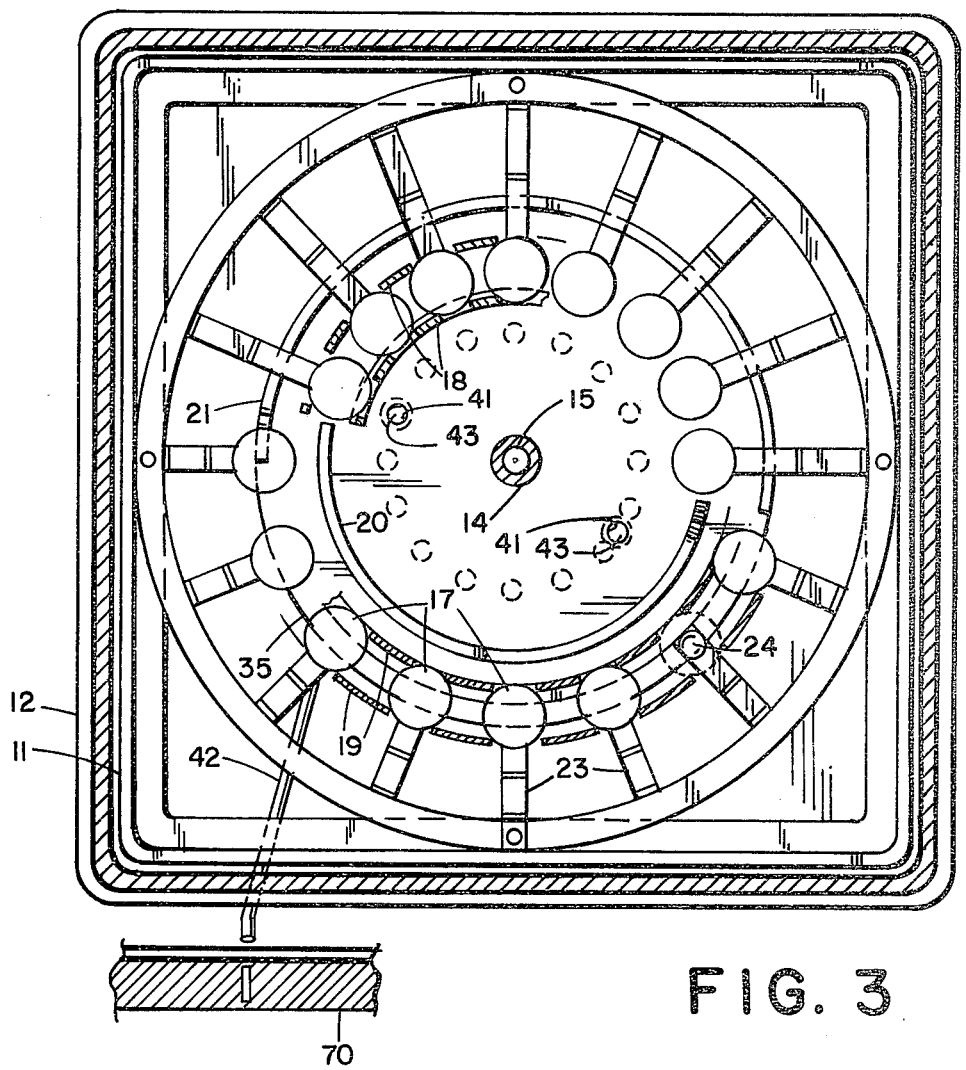
FIG. 3 is a top sectional view taken along line 3—3 of FIG. 2.

As clearly shown in FIGS. 2 and 3, a plurality of flexible support members 23 are arranged within frame 11. In accordance with a preferred embodiment of the present invention these support members extend from the side portions of frame 11 about a circular path. In accordance with the specific example of a balance described hereinbelow, sixteen support members are positioned at about 22¼ degree intervals about a circular path. Each of the support members are secured at one end to a side portion of frame 11 and each have at their opposite end portions means that is adapted to receive and lift one of the balls 17. This means can be, for example, in the form of a cup-like end portion 24. The support members are secured to the frame in a manner which positions a cup-like end portion directly under the vertical path of travel of each of the balls 17, i.e. one support member 23 for each ball 17. Thus, in accordance with the specific example described herein and as shown in FIG. 3, there are eight support members that extend from frame 11 to a position directly under those balls 17 supported in ring 18 that will be lifted vertically by cam track 20 and eight other support members that extend from frame 11 to a position directly under those balls 17 supported in ring 19 that will be lifted vertically by cam track 21 (those support members lifting balls in ring 18 being longer in length than support members lifting balls in ring 19). Each cup-like end portion 24 is adapted to receive and lift one of the weight elements (balls) when the corresponding support member supporting the cup-like end portion is in a vertically raised position as exemplified in FIG. 2 by support member 27 and ball 28 as support member 27 rides on cam track 20. Note, support member 29 which is an example of a support member that is not riding on a cam track. In this instance corresponding ball 30 is supported by ball retaining ring 19.

Figure 4:
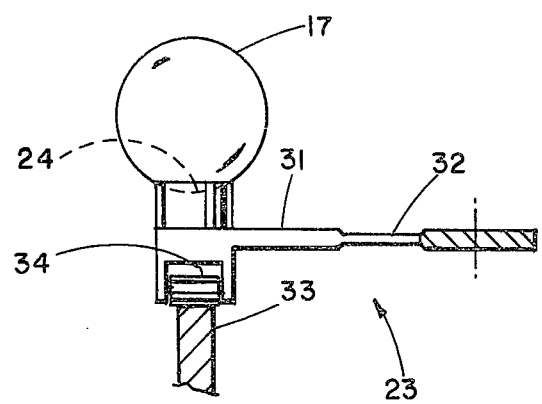
FIG. 4 is a detailed elevational view of a support member in accordance with the present invention.

There is shown in FIG. 4 a specific embodiment for a support member configuration in accordance with the present invention. As illustrated, each support member 23 comprises a flexible arm portion 31 which extends from frame 11 and which is preferably made flexible by a reduced cross section portion 32 along its length. The end portion of the arm which is positioned directly under ball 17 includes at the top thereof a cup-like end portion 24 that is adapted to receive and lift ball 17 and at the bottom portion thereof means to allow the support member to ride on one of the cam tracks 33. This means which is a cam follower is preferably in the form of a roller mechanism 34 which allows support member 23 to easily ride along cam track 33. Each of the support members (including flexible arm portion 31 and cup-like end portion 24) can be formed of one molded piece of plastic wherein reduced cross section 32 can be formed by a reduced cross section within the mold.

Figure 5:
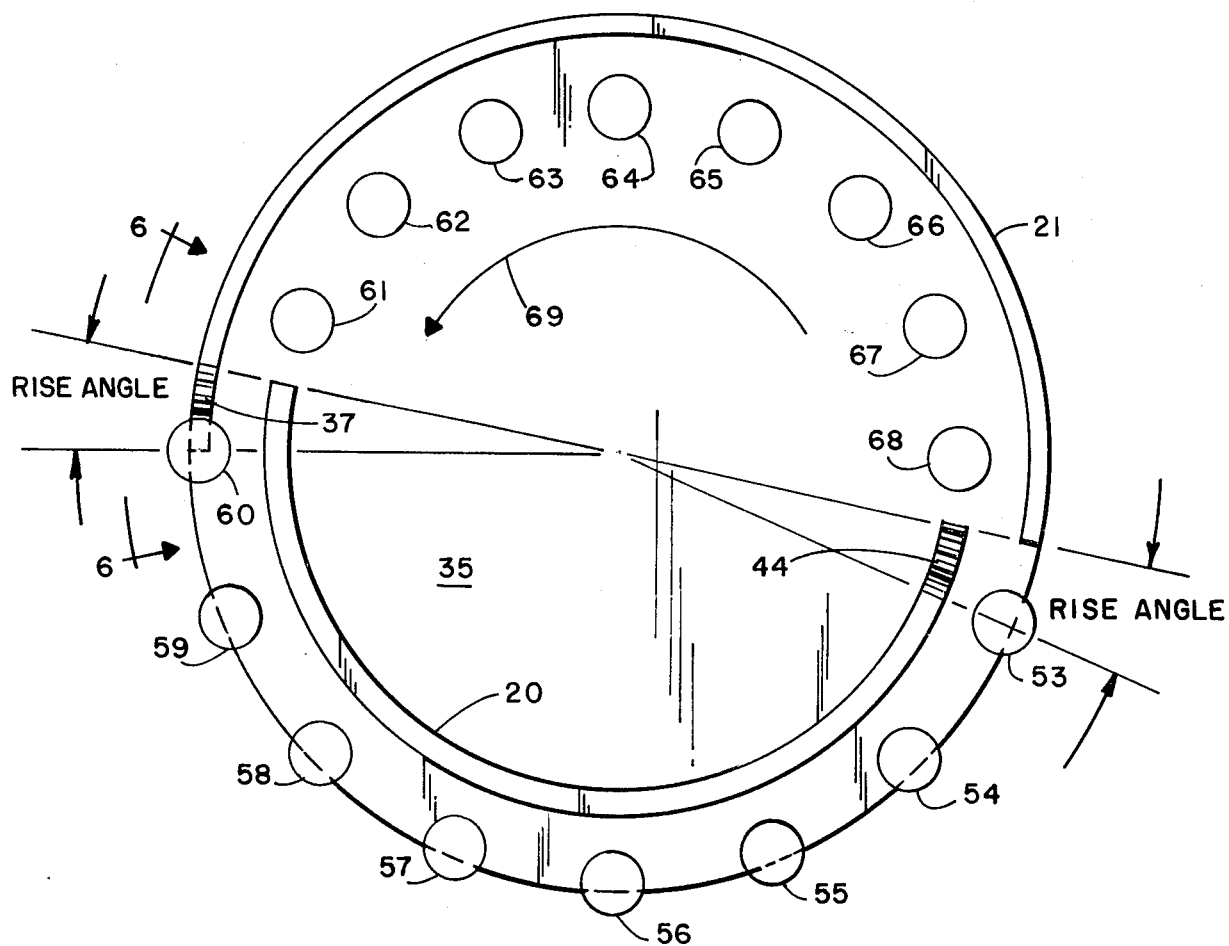
FIG. 5 is a diagrammatic view of an embodiment of the present invention illustrating two concentric cam tracks and the positioning of weight elements thereon.
Figure 6:
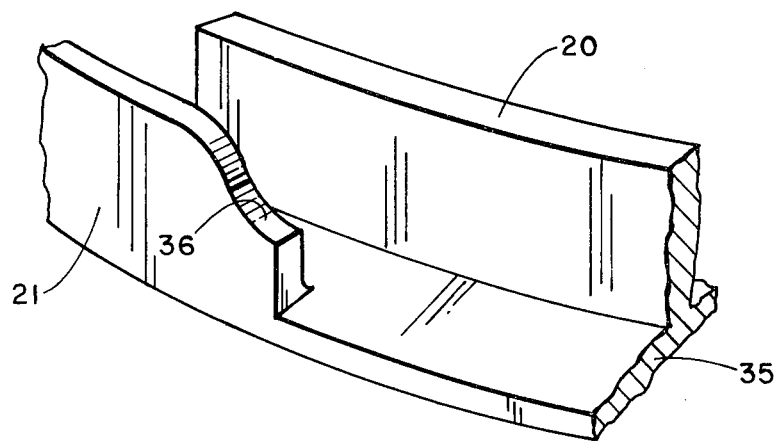
FIG. 6 is a partial elevation view of cam tracks taken along line 6—6 of FIG. 5.

Secured to shaft member 15 is a cam device preferably in the form of a cam plate including circular concentric cam tracks, each of the tracks enabling the support members to ride thereon and to be raised and lowered in the manner as explained in detail hereinbelow. The cam plate (and therefore the cam tracks) is secured to and rotates with shaft member 15. In accordance with the preferred embodiment of the present invention, and as shown in FIGS. 2 and 6, cam plate 35 includes two circular concentric cam tracks 20 and 21, each of the tracks (i) have different radius of curvature; (ii) are positioned on the cam plate diammetrically across from one another; and (iii) are positioned under a plurality of the support members. Each of cam tracks 20 and 21 include a rise angle portion 36 which enables support members 23 to smoothly ride up onto the lower from the cam tracks during operation of the balance. As clearly shown in FIG. 5 the two cam tracks 20 and 21 are positioned on the cam plate in different sectors. The sectors are preferably diammetrically across from one another and are each about 180 degrees except for the 11¼ degrees overlap portion required by the rise angle portion 37 of the outer cam track 21. In operation, as cam tracks 20 and 21 are rotated by motor 16, the cam follower (roller 34) of a support member that is not supporting a ball (see support member 29 and ball 30 in FIG. 2) is engaged by the rise angle portion of a cam track to raise the support member onto the cam track thereby vertically lifting the ball directly under the support member (see support member 27 and ball 28 in FIG. 2). To provide a more even weight distribution on pan 12 (i.e. a more even weight distribution of the weight elements 17 on the pan) and thereby reduce the friction between hollow shaft member 14 and the motor shaft 15 during operation of the balance, the two cam tracks 20 and 21 are positioned on the cam plate to travel in a manner whereby the tracks alternately lift weight elements 17. As previously stated it is preferred that each of the cam tracks be positioned in two different and opposite sectors each about 180 degrees, and thereby in accordance with the specific example given herein, each of the cam tracks will in an alternate manner cause the lifting of eight of the balls 17.

A switch 38 is electrically connected to motor 16 and energizes the motor when pan 12 is depressed by a load 13 in the manner as more fully described hereinbelow. The switch is preferably a double pole type electrical displacement switch having one portion thereof mounted on the bottom portion of pan 12 (see FIG. 2).

Balance 10 includes a read-out system for visually displaying the weight of the load. This system can include, for example, lamps 39 and 40 secured to the cam plate on the top portion thereof so that the lamps revolve along with the cam tracks. Located directly under each of lamps 39 and 40 is an opening 41 which permits light to be projected from lamps 39 and 40 to any of a plurality of light pipes 42 as cam tracks 20 and 21 rotate around their respective paths of travel. One end portion 43 of each of the light pipes is arranged about a path positioned directly under the closed path of travel of lamps 39 and 40 (see FIG. 3). Each of the other end portions of each of the light pipes is positioned by a number on display panel 70 that corresponds to the different measurements of weight.

The primary function of motor 16 is to turn shaft member 15 and thereby guide cam tracks 20 and 21 about a path alternately into contact with successive lowered and unsupported support members 23 (or away from vertically raised support members when the motor operates in reverse in the manner as described hereinbelow) in a step-by-step manner, i.e. a motor capable of moving one pole position for every input pulse. Examples of the type of motors that can be used to accomplish this function include a stepping motor or a DC servo motor with a shaft encoder. The invention will hereinafter be described using a stepping motor for illustrative purposes. In accordance with the present invention any conventional stepping motor can be used. With a sixteen division scale (one using sixteen weight elements or balls 17), the number of poles on the stepping motor would be selected to be a multiple of sixteen so that the poles would then determine the intermediate stopping points at each of the positions where a ball is located and is to be lifted or lowered. A thirty-two (32) pole stepping motor would be used in accordance with the example described herein such that cam tracks 20 and 21 would have intermediate stopping points about every 11¼ degrees. In order for the cam tracks to alternately lift support members 23, the cam tracks are positioned on cam plate 35 such that when a support member 23 is lifted onto cam track 21 via rise angle portion 37, a second support member will be positioned at the beginning of rise angle portion 44 of cam track 20. When the next 11¼ degree turn occurs this second support member will be lifted onto cam track 20 (see FIG. 5).

As illustrated in FIG. 2, pan 12 is supported on shaft member 15 in a manner which enables the pan to float on the shaft member by spring 45. The pan lies on the spring in such a manner whereby it can move vertically (float) on shaft member 15. Preferably two bearings 46 and 47 are provided between shaft member 15 and the inside surface of hollow shaft member 14 which permit the shaft member to freely rotate within the hollow shaft member and also allow pan 12 to move freely in a vertical direction on shaft member 14. Also provided is a means to prevent any rotational movement of pan 12 without interferring with the vertical movement of the pan. This can be accomplished, for example, by the use of a freely pivoting linkage device 48 secured at one end to the pan and at the other end to frame 11.

There are several types of systems that can be used with the balance of the present invention to permit one to "zero" the balance. For example, illustrated in FIG. 2 is an adjusting screw 49 which permits one to "zero" the balance. With no weight on pan 12, the pan will settle to a certain position on spring 45. By turning the adjusting screw, element 50 moves up or down as indicated by arrow 51 thereby raising or lowering the pan via spring 45 so that the pan can be brought to such a position that with no weight thereon, the two poles of switch 38 will not touch but will lie in contiguous relation, and thus all of the support members 23 will be in a lowered position with all of balls 17 being supported within ball retaining rings 18 and 19.

The balance in accordance with the present invention has particular use as a low range automatic balance in the postal field. Although the balance described herein is for measuring the weight of objects of less than or equal to one pound, it is to be noted that low range balances in accordance herewith can include balances for measuring objects, practically speaking, up to about four pounds. A one pound balance in accordance with the features of the present invention would employ sixteen one ounce balls (weight elements) each made of some dense material, preferably steel, and each being accurately machined to a precise diameter, and thus a precise weight of one ounce. The entire balance has a primary overall advantage that it can be constructed very inexpensively by being made out of different plastic materials. This would include such parts as, for example, frame 11, support members 23, pan 12, shaft member 15, cam plate 35 (including cam tracks 20 and 21), etc. The cam plate including the two cam tracks thereon can be, for example, molded of a single piece of plastic.

In operation, a user would start using balance 10 by first turning on the on/off switch 52 which allows electrical current to flow to the balance. With no weight on pan 12, all of the sixteen support members 23 would be in a lowered and non-supported position as exemplified by support member 29 in FIG. 2. All of the corresponding balls would be resting within the confines of the ball retaining rings 18 and 19. As clearly shown in FIG. 5, with no weight on pan 12(i) balls 53 through 60, which will be lifted by the movement of cam track 21, lie over that portion of cam plate 35 where the support members under each of these balls are not supported by the cam track, and (ii) balls 61 through 68 which will be lifted by the movement of cam track 20, lie over that portion of the cam plate where the support members under each of these balls are not supported by the cam track. It is further noted that with no weight on pan 12 the roller for the support member positioned under ball 60 is positioned at the beginning of the rise angle portion 37 of cam track 21 and the roller for the support member positioned under ball 68 is positioned at about 11¼ degrees from the rise angle portion 44 of cam track 20. When a weight is placed on pan 12, the pan descends vertically causing the two poles of switch 38 to make contact. Since the switch is electrically connected to stepping motor 16, placing a weight on the pan energizes the stepping motor which starts shaft member 15 rotating thereby rotating cam plate 35 and thus cam tracks 20 and 21 about their respective paths in the direction as shown by arrow 69. For a postal balance, any weight placed on pan 12 that weighs up to and including one ounce will display a one ounce reading on display panel 70. Thus, when any weight less than or equal to one ounce is placed on the pan, the stepping motor will cause cam tracsk 20 and 21 to move a distance about a circular path in the direction of arrow 69 of about $11\frac{1}{4}$ degrees. When this occurs, the support member under ball 60 will ride onto cam track 21 via the rise angle portion 37 thereof thereby lifting ball 60. As shown in FIG. 2, when this motion occurs, cup-like end portion 24 is pushed through opening 71 in the bottom portion of the U-shaped channel ball retaining ring and lifts the ball vertically so that it no longer rests within the ball retaining ring.

Figure 7:
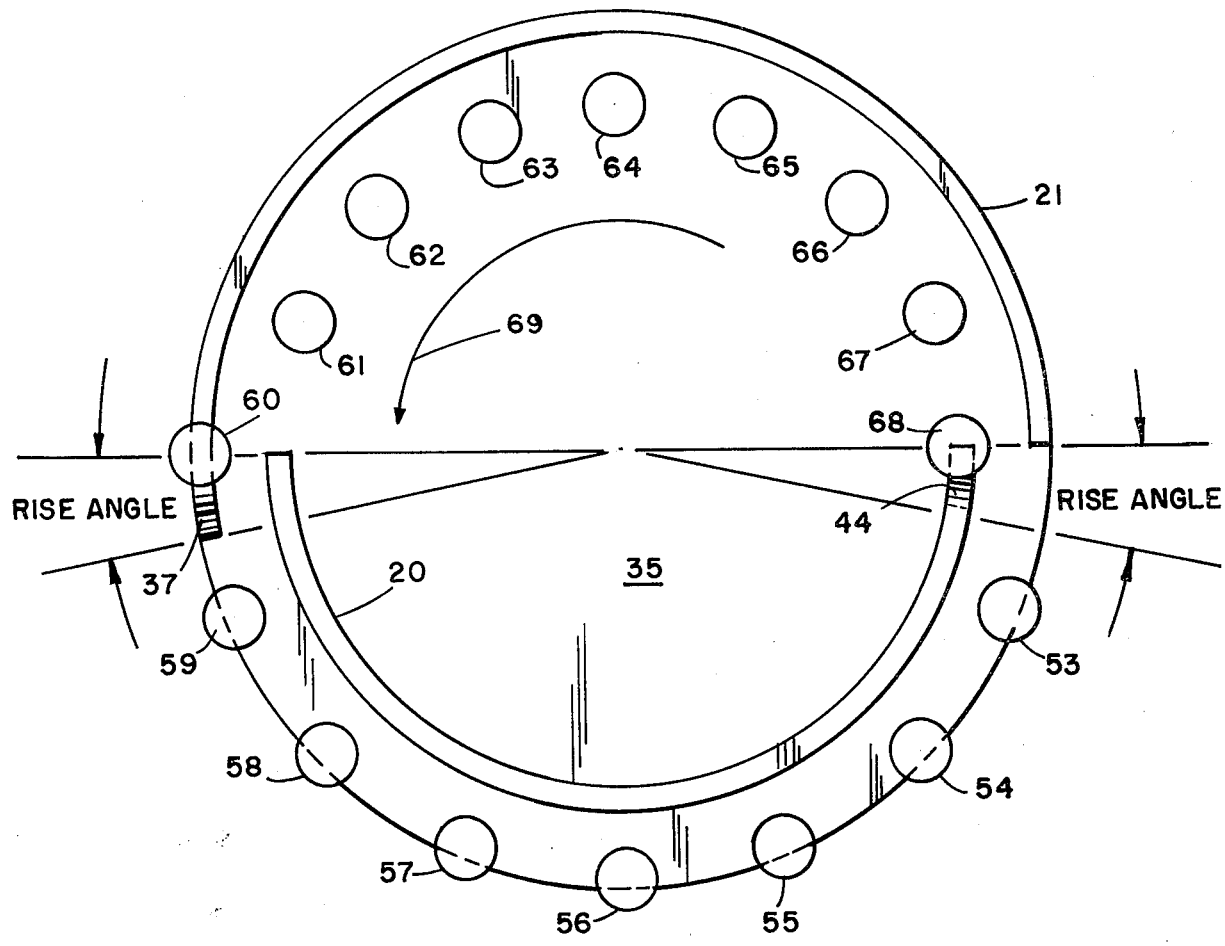
FIG. 7 is a diagrammatic view of the embodiment shown in FIG. 5 after the cam tracks have revolved about 11¼ degrees.

As shown in FIG. 7, at the same time that the support member under ball 60 has been lifted onto cam track 21 with the first $11\frac{1}{4}$ degree movement, the support member under ball 68 is positioned at the beginning of the rise angle portion 45 of cam track 20. Thus, with the next $11\frac{1}{4}$ degree movement of the cam plate via motor 16, ball 68 will be lifted off the ball retaining ring and ball 59 will be positioned at the beginning of the rise angle portion 37 of cam track 21. To provide a more even weight distribution on pan 12 during operation of the scale, cam track 20 is positioned on cam plate 35 to operate alternately on those support members that are located in a sector diametrically opposite from the support members that cam track 21 operates on. At this point in the weighing operation, pan 12 would be in equilibrium with the weight thereon thereby allowing the pan to float on spring 45 to its original position (i.e. the position of the pan without a weight thereon) causing the poles of switch 38 to open, thereby stopping stepping motor 16. The light from light source 39 or 40 would project through an opening 41 in the cam plate to the corresponding light pipe whose end portion is positioned thereby. Thus, that part of display panel 70 that shows the number 1 (representing a one ounce weight) would light up.

If, for example, the initial weight placed on pan 12 weighed over one ounce, but less than or equal to two ounces, then after cam track 21 caused the lifting of ball 60, the stepping motor would cause cam tracks 20 and 21 to rotate an additional $11\frac{1}{4}$ degrees thereby placing the support member under ball 68 to rise onto cam track 20 thereby lifting ball 68. Thus, as described above, the second ball would be lifted off its ball retaining ring and a light source would then be positioned over the corresponding light pipe representing a two ounce weight which would light as two ounces on the display panel. Whenever a sufficent number of balls (up to 16) representing the total weight of the object on the pan (up to a total of 16 ounces) have been lifted off of their respective ball retaining rings, spring 45 returns to its original position (its position without any weight) which causes the poles of switch 38 to open and power to be removed from the stepping motor so that it stops rotating. At that point a light will be positioned over a light pipe that corresponds the amount of weight on the pan. In turn, the light pipe conducts light to display screen 70 located on the front portion of the base of the balance correspondingly lighting up a number on the display screen equivalent to the number of balls that have been removed from the ball retaining rings 18 and 19.

When the object being weighed is removed from the balance, pan 12 moves vertically upwards on spring 45 such that the second pole of double pole switch 38 is closed. This causes stepping motor 16 to rotate in a reverse direction thereby causing shaft member 15 and cam tracks 20 and 21 to rotate about their same paths, but in a direction reverse to the direction of arrow 69. Thus, if the entire object being weighed is removed from the pan, cam tracks 20 and 21 travel in a reverse direction (i.e. travel at about $11\frac{1}{4}$ degree movements) about their paths and alternately lower each of the support members 23 positioned on the cam tracks. The support members which are in an extended position, are then each successively lowered back down to a position off of a cam track and each of the balls 17 are thereby lowered back down into their respective ball retaining ring unit in an alternate manner corresponding to the format followed when the balls were removed from the ring unit, but in a reverse manner. The balance mechanism returns to the neutral position which is the zero position if the weight is completely removed from the pan. The positioning of cam tracks 20 and 21 with respect to all of the balls is then as shown in FIG. 5.

The balance in accordance with the features of the present invention is constructed so as to be substantially insensitive to various load shifts or eccentric loads which occur, for example, when the item to be weighed is placed on a corner or an edge of pan 12. The device mechanism of motor 16 is such that shaft member 15 oscillates slightly about any one of the pole positions of the motor. When, for example, the motor is a stepping motor, the oscillations are made by shaping the current pulses (e.g., reducing the voltage amplitude and/or duration) to having a continual oscillation. This oscillation, which will impart a relatively small rotational relative movement between the supporting shaft 15 and bearings 46 and 47 will allow the pan to adjust axially on the shaft so that any frictional hysterisis will be substantially eliminated.

While this invention has been described in conjunction with specific embodiments thereof, it is evident that many alternatives, modifications and variations will be apparent to those skilled in the art. Accordingly, the present invention is intended to embrace all such alternatives, modifications and variations and fall within the spirit and scope of the appended claims.

I claim:

1. A weighing device comprising:

a frame;

a pan element for supporting a load to be weighed;

means connected to said pan for retaining a plurality of weight elements in a vertically movable manner;

a motor supported within said frame;

a shaft member operatively connected to and extending from said motor and supporting said pan element;

a plurality of support members each including a cam follower and each adapted to receive and lift one of said weight elements;

two circular concentric cam tracks rotating with said shaft member, each of said tracks (i) have a different radius of curvature, (ii) are positioned diammetrically across from one another and (iii) are positioned under a plurality of said cam followers; and switching means for energizing said cam motor when said pan is depressed by a weighted load, said motor turning said shaft member and guiding the two concentric cam tracks alternately into contact with successive cam followers on said support members in a step-by-step manner to lift a number of said support members and alternately raise said weight elements diametrically across from each other and thereby lift a corresponding number of said weights substantially equal to the weight of said load.

2. A weighing device according to claim 1 wherein there is provided on said pan a separate means for retaining said weight elements that corresponds in position to each of said cam tracks.

3. A weighing device according to claim 1 wherein said means for retaining the weight elements comprises two concentric channel members.

4. A weighing device according to claim 1 wherein each of said support members are in the form of a flexible arm extending from a side portion of said frame.

5. A weighing device according to claim 1 wherein each support member includes a cam follower that enables the support members to ride on said cam tracks.

6. A weighing device according to claim 1 wherein said motor is a stepping motor.

7. A weighing device according to claim 1 wherein said weight elements comprises sixteen elements, each of said elements weighing about one ounce.

8. A weighing device according to claim 1 further comprising read-out means for visually displaying the weight of said load.

9. A weighing device according to claim 1 wherein said cam follower is a roller mechanism.

* * * * *